US012587470B2

(12) United States Patent
Sivaramu et al.

(10) Patent No.: US 12,587,470 B2
(45) Date of Patent: Mar. 24, 2026

(54) EXTEND HIGH CPS FLOW TABLE MANAGEMENT FROM DPU TO HOST CPU

(71) Applicant: Advanced Micro Devices, Inc., Santa Clara, CA (US)

(72) Inventors: Raghava Sivaramu, Santa Clara, CA (US); John Cruz, Santa Clara, CA (US); Krishna Doddapaneni, Cupertino, CA (US); Sarat Babu Kamisetty, Fremont, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 31 days.

(21) Appl. No.: 18/623,129

(22) Filed: Apr. 1, 2024

(65) Prior Publication Data

US 2025/0310244 A1     Oct. 2, 2025

(51) Int. Cl.
*G06F 15/173* (2006.01)
*H04L 9/40* (2022.01)
*H04L 45/00* (2022.01)

(52) U.S. Cl.
CPC ............ *H04L 45/38* (2013.01); *H04L 45/566* (2013.01); *H04L 63/20* (2013.01)

(58) Field of Classification Search
None
See application file for complete search history.

(56) References Cited

U.S. PATENT DOCUMENTS

2022/0166718 A1* 5/2022 Kamisetty ........... G06F 9/30036
2023/0066013 A1* 3/2023 Ball ....................... G06F 21/606

* cited by examiner

*Primary Examiner* — Wing F Chan
*Assistant Examiner* — Andrew Woo
(74) *Attorney, Agent, or Firm* — Patterson + Sheridan, LLP

(57) ABSTRACT

Embodiments herein describe a system including a host having a policy agent and a data plane development kit (DPDK) interface and a data processing unit (DPU) to transmit packets to the host, wherein the DPDK interface of the host performs operations including evaluating the packets, generating packet evaluation results, selecting, with the policy agent, a data processing library based on the packet evaluation results, and transmitting a control packet that includes the data processing library from the policy agent of the host to the DPU. The DPU is further configured to receive the control packet and program datapath tables based on the data processing library.

20 Claims, 5 Drawing Sheets

EXTEND HIGH CPS FLOW TABLE MANAGEMENT FROM DPU TO HOST CPU

TECHNICAL FIELD

Examples of the present disclosure generally relate to data processing units (DPUs) providing the capability to perform flow-based networking services.

BACKGROUND

Data processing units (DPUs) have become the backbone of next-generation data centers, powering many accelerated network functions (NFs). AMD Pensando™ programmable DPUs provide many functions, such as software-defined networking, software-defined storage, and peripheral component interconnect express (PCIe) services. DPUs have a programmable data path. AMD Pensando™ DPUs are capable of running programming protocol-independent packet processors (P4) programs natively. P4 is a standardized open-source domain-specific language to program input/output (I/O) processing devices on how to handle network traffic.

SUMMARY

One embodiment described herein is a DPU including a plurality of cores and a datapath to communicate with a policy agent of a host via a data plane development kit (DPDK) interface running on the host, wherein the datapath is configured to transmit packets to the host, wherein the DPDK interface is configured to select, with the policy agent, a data processing library based on packet evaluation results and transmit a control packet that includes the data processing library from the policy agent of the host to the DPU, and receive the control packet from the host. The plurality of cores is configured to program datapath tables based on the data processing library.

One embodiment described herein is a system including a host including a policy agent and a data plane development kit (DPDK) interface and a data processing unit (DPU) to transmit packets to the host, wherein the DPDK interface of the host performs operations including evaluating the packets, generating packet evaluation results, selecting, with the policy agent, a data processing library based on the packet evaluation results, and transmitting a control packet containing the data processing library from the policy agent of the host to the DPU. The DPU is further configured to receive the control packet and program datapath tables based on the data processing library.

One embodiment described herein is a non-transitory computer-readable storage medium storing instructions, which when executed on one or more processing devices, uses a data plane development kit (DPDK) interface running on a host to perform operations including receiving packets from a data processing unit (DPU), evaluating the packets, generating packet evaluation results, selecting, with a policy agent of the host, a data processing library based on the packet evaluation results, and transmitting the data processing library from the policy agent of the host to the DPU.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
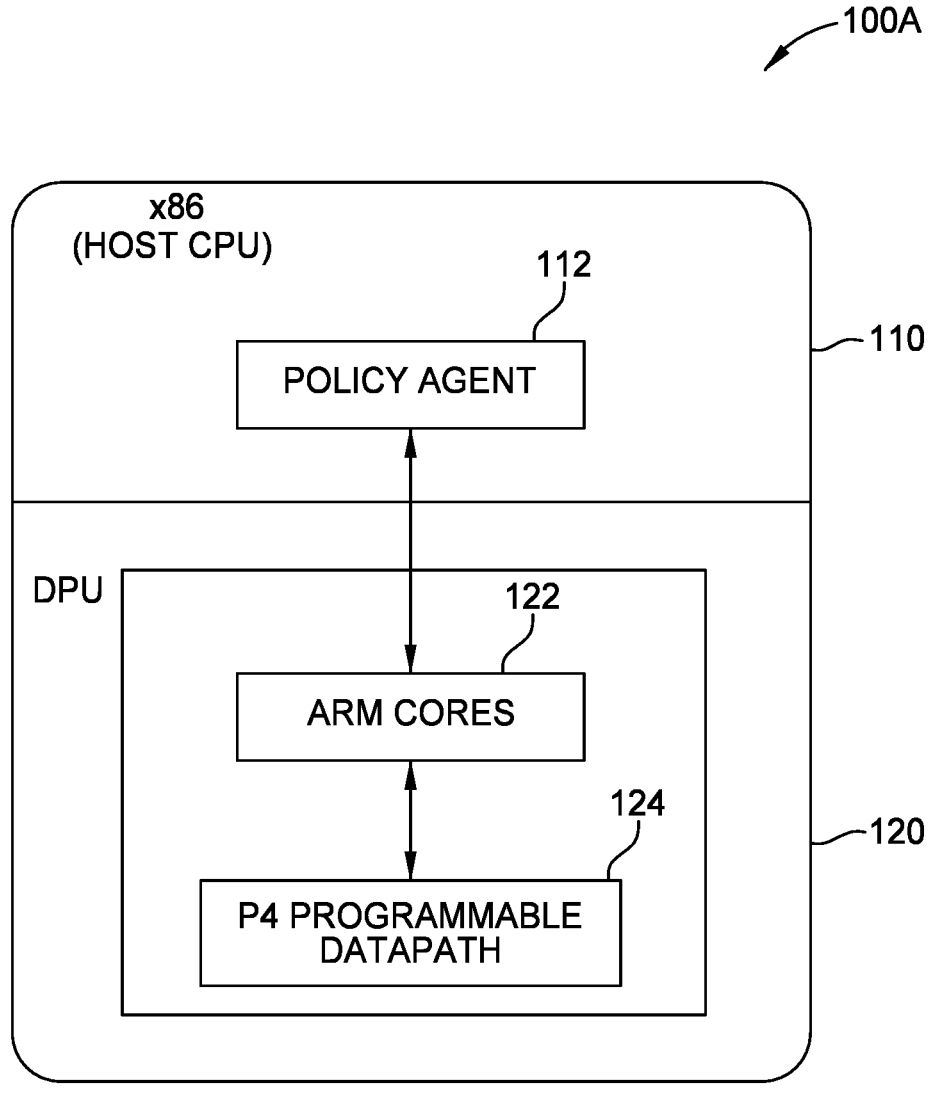
FIG. 1 illustrates a data processing unit (DPU) software architecture, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

A data processing unit (DPU) is a purpose-built piece of silicon technology that is designed for handling network data traffic. A DPU is a programmable processor designed to efficiently handle data-centric workloads such as data transfer, reduction, security, compression, analytics, and encryption, at scale in data centers. By offloading data traffic to a DPU, compute intensive tasks may be optimized on computer processing unit (CPU) and graphical processing unit (GPU) resources. DPUs are rapidly becoming an important component in modern computing because of their ability to improve the efficiency and performance of data centers by offloading workloads from the CPU and the GPU.

In general, DPUs offload network and communication workloads from the CPU and GPU, freeing up resources for application processing. By combining processing cores with hardware accelerator blocks to handle data-centric workloads at scale, DPUs can improve performance and reduce latency. DPUs are designed to process data-intensive workloads in large-scale data centers supporting cloud environments or supercomputers driving artificial intelligence (AI), deep learning algorithms, and other data-intensive applications. DPUs can be scaled to accommodate increasing workloads in volume and complexity as data center needs grow and become more intensive. Additionally, DPUs can be added to existing hardware infrastructure, allowing for a flexible and adaptable data center architecture. DPUs can provide improved reliability through features like redundancy and high availability, ensuring the continuity of important data processing tasks in the event of hardware failures. DPUs can reduce overall hardware costs related to managing a data center by offloading processing tasks from the CPU and GPU, and handling complex tasks, thereby enabling the use of fewer hardware components.

Therefore, DPUs work with CPUs and GPUs to enhance computing power and the handling of increasingly complex modern data workloads. The DPU market has steadily gained traction thanks to a rise in demand for artificial intelligence (AI), machine learning, deep learning, Internet-of-Things (IoT), 5G, and complex cloud architectures.

DPUs are capable of running Programming Protocol-independent Packet Processors (P4) programs natively in their match processing units (MPUs). P4 is a standardized open-source domain-specific language to program input/output (I/O) processing devices on how to handle network traffic.

P4 is a domain-specific language for network devices, specifying how data plane devices (e.g., switches, network interface controllers (NICs), routers, filters, etc.) process packets. Before P4, vendors had total control over the functionality supported in the network. And since networking silicon determined much of the possible behavior, silicon vendors controlled the rollout of new features (e.g., virtual extensible local area network (VXLAN)), and rollouts took years. P4 turns the traditional model on its head. Application developers and network engineers can now use P4 to implement specific behavior in the network, and changes can be made in minutes instead of years.

In routing, the forwarding plane, sometimes called the data plane or user plane, defines the part of the router architecture that decides what to do with packets arriving on an inbound interface. Most commonly, it refers to a table in which the router looks up the destination address of the incoming packet and retrieves information to determine the path from the receiving element, through the internal forwarding fabric of the router, and to the proper outgoing interface(s).

In the realm of network management, two components play a role in how data is handled, that is, the control plane and the data plane. These two entities, while working in tandem, perform distinct functions that are integral to the smooth operation of a network.

The control plane is tasked with making decisions on how data should be managed, routed, and processed. The control plane acts as a supervisor of data, coordinating communication between different components and collecting data from the data plane. The control plane uses various protocols, such as, routing protocols, network management protocols, and application layer protocols. These protocols often employ software-defined networking (SDN) to create virtual networks and manage their traffic. Virtual networks, facilitated by SDN, are instrumental in managing data traffic at an enterprise level. They enable organizations to segment traffic, prioritize data flows, and isolate traffic from different parts of the network.

While the control plane supervises and directs, the data plane is responsible for the actual movement of data from one system to another. The data plane is the workhorse that delivers data to end users from systems and vice versa. Data planes can include, e.g., Ethernet switches, Wi-Fi networks, cellular networks, etc. Data planes can also include virtualized networks, like those created using virtual private networks (VPNs) or software-defined networks (SDNs). Additionally, data planes can include dedicated networks, like the IoT or industrial control systems.

Data planes allow organizations to quickly and securely transfer data between systems. For example, a data plane can enable the transfer of data between a cloud-based application and a local system. This functionality can be beneficial for organizations that access data from multiple systems or that quickly transfer large amounts of data.

The main differences between control planes and data planes are their purpose and how they communicate between different systems. The control plane decides how data is managed, routed, and processed, while the data plane is responsible for the actual moving of data. For example, the control plane decides how packets should be routed, and the data plane carries out those instructions by forwarding the packets. Along with doing different jobs, control planes and data planes exist in different areas. While the control plane runs in the cloud, the data plane runs in the data processing area. They also use different functions to do their jobs. Control planes use protocols to communicate between different systems, mostly common routing protocols or network management protocols like simple network management protocol (SNMP).

Many targets implement both a control plane and a data plane. P4 is designed to specify only the data plane functionality of the target. P4 programs also partially define the interface by which the control plane and the data plane communicate, but P4 may not be used to describe the control plane functionality of the target. Moreover, a P4-programmable switch differs from a traditional switch in two ways, that is:

The data plane functionality is not fixed in advance but is defined by a P4 program. The data plane is configured at initialization time to implement the functionality described by the P4 program and has no built-in knowledge of existing network protocols.

The control plane communicates with the data plane using the same channels as in a fixed-function device, but the set of tables and other objects in the data plane are no longer fixed, since they are defined by a P4 program. The P4 compiler generates the API that the control plane uses to communicate with the data plane.

Target manufacturers provide the hardware or software implementation framework, an architecture definition, and a P4 compiler for that target. P4 programmers write programs for a specific architecture, which defines a set of P4-programmable components on the target as well as their external data plane interfaces. Compiling a set of P4 programs produces two artifacts, that is, a data plane configuration that implements the forwarding logic described in the input program and an application programming interface (API) for managing the state of the data plane objects from the control plane P4 is a domain-specific language that is designed to be implementable on a large variety of targets including programmable network interface cards, field programmable gate arrays (FPGAs), software switches, and hardware application-specific integrated circuit (ASICs). As such, the language is restricted to constructs that may be efficiently implemented on all of these platforms.

DPUs have a programmable data path. DPUs can handle classic P4 functions such as packet parsing, manipulation, tunneling, and access control lists (ACLs). AMD Pensando™ P4 programs may implement (periodic) timer events, handle asynchronous events triggered by state transitions, generate notifications, craft and send packets inline, etc., making it possible to implement complex features and custom network protocols natively in the P4 data path. For example, network functions like transmission control protocol/transport layer security (TCP/TLS) proxies, non-volatile memory express (NVMe) over TCP, Internet protocol security (IPsec), Active-Active or Active-Passive HA state machines, and flow aging may be implemented inline in the fast path processors. Although the AMD Pensando™ DPU also has general-purpose CPU cores, the goal is to not use these to handle fast path data traffic, thus providing both programmability and performance at the same time. Utilization of CPUs for such services may degrade the fast path performance, scale, throughput (as measured by packets per second or PPS), and latency.

One challenge in this data-path forwarding paradigm is to be able to classify or create or update or delete flow entries into the data-path tables at a very high rate (in the order of millions per second) to be able to keep up with high incoming connections of various application flows, in a multi workload environment (e.g., a cloud environment).

The AMD DPU enforces an architectural constraint that restricts the read/write access to the P4 hardware flow table only to the DPU's CPU, since the DPU memory may not be directly accessed from outside of the DPU (e.g., to provide a communication gap between host and DPU, for security reasons). Hence the software agent(s) running on the host CPU may not directly perform insertions/deletions of flow entries into the DPU P4 flow table, but instead would use a software proxy on the DPU's CPU to perform this task.

This constraint leads to a bigger challenge in supporting high connections per second (CPS) flow table management capability in the DPU deployment environments where the flow-programming software agent(s) aren't run in the DPU's CPU cores, but rather are maintained in the host X86 CPUs.

The exemplary embodiments present a method to achieve high CPS flow table transactions (i.e., create/update/delete) in the DPU environment where the flow programming software agent is running in the host x86 CPUs to which the DPU is connected over the peripheral component interconnect express (PCIe) interface. As such, sustained high CPS rates of DPU flow table management can be achieved from software agent(s) running in host x86 CPU(s).

FIG. 1 illustrates a data processing unit (DPU) software architecture, according to an example.

A DPU, a CPU, and a GPU are all computing processors, each performing a different function. The CPU is the main processor responsible for the overall operation of a computer system, serving as the brain of a computer. The GPU is a specialized processor for graphics computing tasks, such as rendering 3D images or videos. The DPU is the newest processor, specializing in data-centric workloads, such as networking, storage, and security operations in data centers.

CPUs consist of a few powerful processing cores optimized for serial or sequential processing, meaning one task after another. GPUs have a large number of simpler cores optimized for parallel processing, meaning simultaneous tasks. DPUs combine processing cores, hardware accelerator blocks, and a high-performance network interface to process data-centric tasks at scale. The DPU may be used to improve data center infrastructure by increasing efficiency, enhancing data processing speed, and reducing workload on CPUs, leading to faster and more reliable data processing.

To use a DPU, a server or networking device has a compatible PCIe slot for the DPU card. The hardware should also have a compatible operating system (OS) and drivers, sufficient memory for the DPU to function properly, and reliable power and cooling. The DPU offloads network and communication workloads from the CPU by handling large-scale data processing tasks. Such data-centric workloads range from data analytics, transfer, reduction, security, compression, analytics, compression, and encryption. DPUs are beneficial for storage networking. Practical applications may include artificial intelligence and machine learning, big data analytics and processing, video transcoding and streaming, network traffic processing and security, and storage I/O acceleration.

The architecture 100A includes a CPU 110 and a DPU 120.

The CPU 110 may be, e.g., a X86 CPU. The CPU 110 may also be referred to as a host CPU. The CPU 110 further includes a policy agent 112.

The CPU 110 communicates with the DPU 120. The DPU 120 includes ARM cores 122 and a P4 programmable datapath 124. ARM cores 122 refer to ARM processors. An ARM processor is one of a family of CPUs based on the reduced instruction set computer (RISC) architecture for computer processors.

The policy agent 112 of the CPU 110 directly communicates with the ARM cores 122 of the DPU 120. The policy agent 112 may not directly communicate with the P4 programmable datapath 124. As noted above, the AMD DPU enforces an architectural constraint that restricts the read/write access to the P4 hardware flow table only to the DPU's CPU, since the DPU memory may not be directly accessed from outside of the DPU 120, for security reasons. Hence the policy agent 112 running on the host CPU 110 is prevented from directly performing insertions/deletions of flow entries into the DPU P4 flow table, but instead uses a software proxy on the DPU's CPU to perform this task. Thus, the policy agent 112 running on the host CPU 110 communicates with a software proxy on the ARM cores 122, which has access to the DPU P4 datapath tables where flow/session entries are programmed. The communication between policy agent 112 and the software proxy takes place over, e.g., an Ethernet device.

Figure 2:
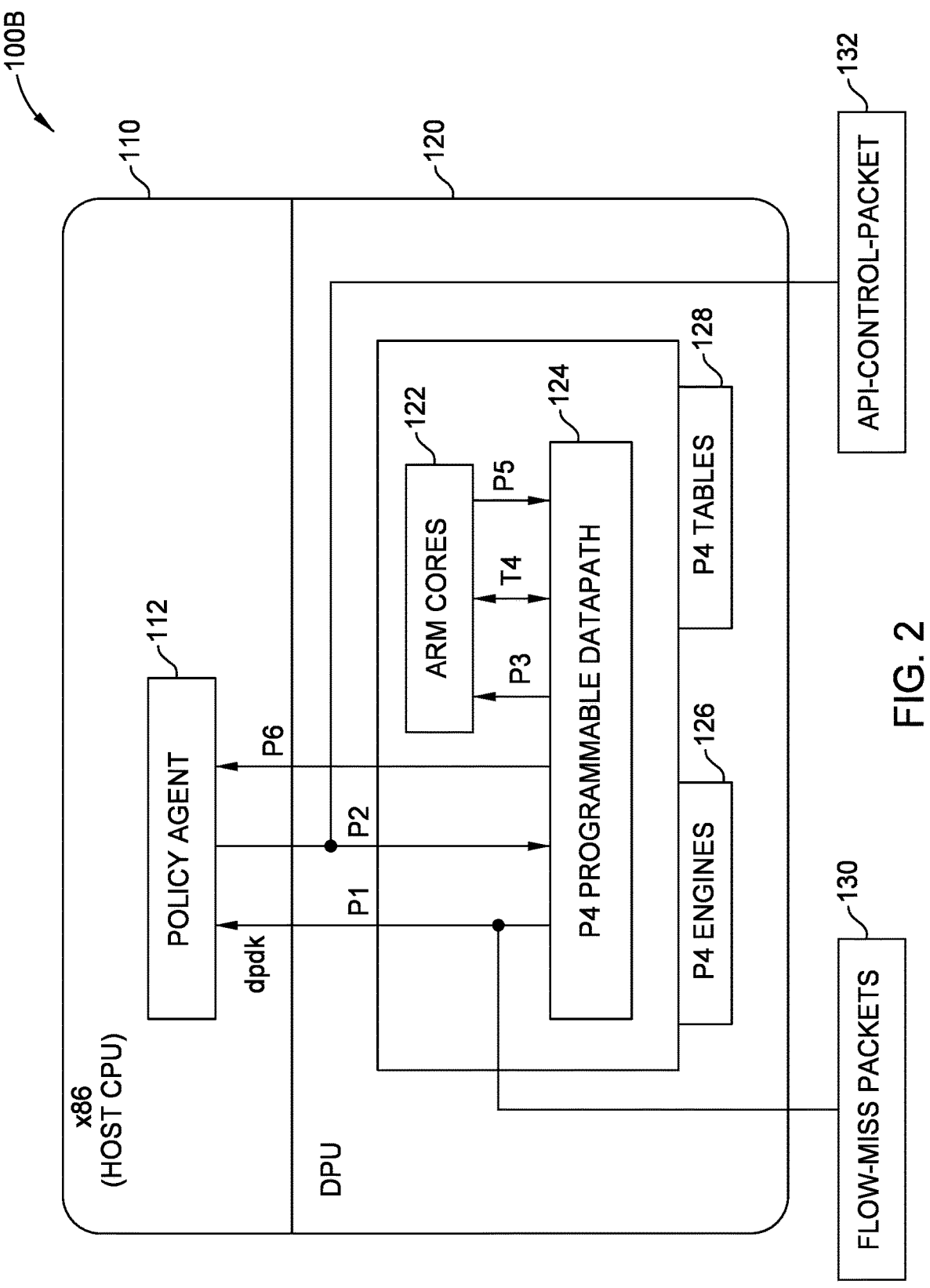
FIG. 2 illustrates a DPU software architecture showing a sequence to perform DPU P4 flow table programming with an application programming interface (API)-Control-Packet, according to an example.

FIG. 2 illustrates a DPU software architecture showing a sequence to perform DPU P4 flow table programming with an application programming interface (API)-Control-Packet, according to an example.

The architecture 100B is similar to the architecture 100A of FIG. 1, and a description of like elements will be omitted. The DPU 120 is also shown to include P4 engines 126 and P4 tables 128. The DPU 120 is configured to send flow-miss packets 130 to the policy agent 112.

The flow-miss packets 130 from the DPU 120, which are candidate packets for policy evaluation and flow creation, are delivered to the host x86 CPUs (i.e., CPU 110) from the DPU 120 via a set of PCIe Ethernet based physical function/virtual function (PF/VF) interfaces, which are enabled as data plane development kit (DPDK) interfaces on the host CPU with the flow programming software agent having bound to those interfaces as DPDK packet interfaces. In one example, the Pensando IONIC DPDK PMD (Poll Mode driver) is used to enable the DPDK packet interface in the software agent process on the host CPU 110. This is shown as packet P1 in FIG. 2.

PCIe is an interface standard for connecting high-speed components. Desktop personal computer (PC) motherboards have a number of PCIe slots. PCIe slots come in different physical configurations such as x1, x4, x8, x16, x32. The number after the x indicates how many lanes (how data travels to and from the PCIe card) that PCIe slot has. A PCIe x1 slot has one lane and can move data at one data symbol per cycle. A PCIe x2 slot has two lanes and can move data at two data symbols per cycle (and so on). PCIe lanes are the physical link between the PCIe-supported device and the processor or chipset. PCIe lanes consist of two pairs of copper wires, known as traces that run through the mother-board connecting the PCIe-enabled device to either the processor or motherboard chipset.

The PCIe function is defined by a unique identifier, the function ID (FID). Each function specifies a function type and a physical channel identifier (PCHID). Multiple func-tions may be specified to the same PCHID value provided that each of these functions defines a unique VF number. PFs have the ability to move data in and out of the device, while VFs are lightweight PCIe functions that support data flowing but also have a restricted set of configuration resources. The VFs or PFs available to the hypervisor or guest OS depend on the PCIe device.

PFs are full PCIe devices that include single root I/O virtualization (SR-IOV) capabilities. PFs are discovered, managed, and configured as normal PCI devices. PFs con-figure and manage the SR-IOV functionality by assigning VFs. VFs are simple PCIe functions that process I/O. Each VF is derived from a PF. The number of VFs a device may have is limited by the device hardware. A single Ethernet port, the physical device, may map to many VFs that may be shared with VMs.

DPDK is a set of libraries and drivers for fast packet processing. This set of libraries provides the so-called envi-ronment abstraction layer (EAL). The EAL hides the details of the environment and provides a standard programming interface. The DPDK further provides a set of data plane libraries and network interface controller polling-mode driv-ers for offloading transmission control protocol (TCP) packet processing from the OS kernel to processes running in user space.

Referring back to the operation of FIG. 2, the flow-miss packets are evaluated for security policy and forwarding rule (and any other offloaded features) matches in the DPU's P4 engines 126 to assist in flow programming evaluations of the policy agent 112, and the results of this hardware evaluation are encoded in a custom packet metadata of the DPDK packet that is sent to the host DPDK interface(s). Packet spraying across multiple DPDK queues is employed to maximize the rate of packet delivery to the host CPU 110.

The host DPDK driver is integrated with a DPU-Flow-SDK-Lib (e.g., a data processing library), which processes the custom packet metadata present in the packet context received on the DPDK queue(s) from the DPU 120, and the security policy and forwarding results are picked up from this metadata to be delivered to the policy agent 112 as an API input. SDK stands for software development kit in the data processing library.

The policy agent 112 leverages the flow evaluation results from the DPU 120 so that it does not burn the CPU cycles to perform the ACL/policy/routing database evaluations in software and uses the DPU-Flow-SDK-Lib to submit the flow creation request back to the DPU 120 as an API-Control-Packet 132. The API-Control-Packet 132 is built by the DPU-Flow-SDK-Lib by encoding the flow entry key and data fields into a 'PDS-API-Header,' which is a hardware-friendly encoded data-structure that specifies:

A P4 table identifier, which may be a specific flow table, session-table, flow-action table, etc.

A P4 table operation, such as create or update or delete or read.

A P4 table key, where key fields corresponding to the specific P4 table are identified.

A P4 table data, which are data fields that the P4 table lookup should yield, corresponding to the table.

API flags/metadata, that is, any special instructions to the DPU 120 in programming the specific P4 table entry, such as byte swizzling, batching and sequencing parameters, etc.

The policy agent 112 then transmits the API-Control-Packet 132 back to the DPU 120 over the same DPDK interface transmit queue(s) to deliver the flow programming API requests to the DPU 120 as a high-performance packet-interface as opposed to a gRPC/remote IPC API-interface that would have scalability and/or performance limitations.

These packets can carry a unique packet field to identify themselves as API requests to the DPU 120, like a reserved dest-MAC/VLAN/dest-IP field to help in easy classification at the DPU 120.

Optionally, the original packet can also be carried inside the API-Control-Packet 132 with an instruction to the DPU 120 to process the original packet in the P4 flow-based pipeline once the flow entry itself is installed in the P4 table 128. This is in case the software agent (i.e., policy agent 112) does not intend to perform the handling of the original packet forwarding in software. This API-Control-Packet 132 is shown as P2.

The DPU-Flow-SDK-Lib can also encapsulate the API-Control-Packet 132 in a L2/L3 or virtual extensible local area network, that is, a general protocol extension (VXLAN-GPE) header to achieve the following goals:

When the API-Control-Packet 132 is received at the DPU 120 from the policy agent 112 of the host CPU 110, the DPU P4 engines 126 can spray the packets to multiple ARM cores 122 of the DPU 120 based on L3/L4 based receive side scaling (RSS) hashing, to achieve parallelism and multi-core flow programming paradigm, which maximizes a flow pro-gramming rate. This is shown as packet P3.

These packet formats are made to be more portable to pass over a network other than a host PCIe interface, if it is desired to run the policy agent 112 on remote CPUs con-nected over an Ethernet/IP network.

Packet P3 also helps in decoupling the DPU datapath from the x86 (or external) control plane to provide backward compatibility during software upgrades.

The DPU leverages both its P4 engines 126 and ARM cores 122 to process the API-Control-Packet 132 to program the datapath P4 tables 128, based on the type of P4 table entry to be programmed.

All entries corresponding to index-based P4 tables 128, where the exact index key and data are present in the API-Control-Packet 132 may be programmed directly by the P4 engines 126.

All API-Control-Packets 132 carrying requests to pro-gram complex hash-tables are sent to ARM DPDK queues, and such table programming may be handled by the ARM cores 122 based on the DPDK software data-path applica-tion.

The ownership of the P4 tables 128 are divided between P4 direct memory access (DMA) and ARM software at a table level granularity.

This enables load-balancing and parallel handling of the API-Control-Packet requests for different tables in order to increase the API handling rates.

The ARM cores 122 are dedicated as DPDK poll-mode cores whose role is to handle incoming API-request packets and program the corresponding P4 table entries accordingly, and then optionally re-inject any accompanying original data packet back into the P4 hardware pipeline.

The P4 tables 128 are memory-mapped in the DPDK packet-processing threads on the ARM cores 122, and, hence, each core may perform direct memory read/write instructions to program the P4 tables 128.

The API response/status of each table programming transaction is again sent back from the DPU 120 to the host DPDK interface in the same API-Control-Packet format identifying the specific transaction, requested table entry, and its corresponding response status of success/failure opcodes. These packets are shown as P5 and P6.

The table programming operations from ARM are shown as T4. These are table read/write/update operations.

In order to maintain sustained high CPS rates, the DPU hardware P4 engines also assist in flow-ageing by performing high precision scans to identify idle flows and report them via the same host DPDK interface queues to the policy agent 112. This may result in the policy agent 112 invoking the DPU-Flow-SDK-Lib to build flow-delete requests as API-Control-Packets 132 and transmit those requests on the same DPDK interface transmit queue(s) back to the DPU, in a similar fashion as the flow-create path described above.

The DPU-Flow-SDK-Lib is generalized to handle the table management of any DPU P4 table 128 that is used in fast-path forwarding, and not restricted to the flow table alone, although the latter is the only table usually employed in high-rate transactions. This enables the entire DPU P4 fast-path table management to be performed from the x86 host based on management/config/data software agent(s) via a single high-performance packet-based API interface.

The exemplary methods thus achieve high CPS flow table transactions (i.e., create/update/delete) in the DPU environment where the flow programming software agent is running in the host x86 CPU(s) to which the DPU is connected over the PCIe interface. As such, sustained high CPS rates of DPU flow table management can be achieved from software agent(s) running in host x86 CPU(s). The exemplary methods introduce a high-performance packet interface to perform DPU P4 flow table programming with the DPDK based API-Control-Packet header to extend the high CPS flow-table paradigm from the DPU to the host x86 CPUs. The exemplary methods extend the flow evaluation hardware-assists for packet classification/security policy/forwarding decisions and the hardware flow-ageing assists to be offloaded from host software agents, and provide a library for programmatic interfaces for custom API-Control-Packet formats to achieve parallelism across multi-core CPUs in both the host and the DPU. The exemplary methods introduce hardware (HW) offload/assist in P4-table programming of index and hash tables from the PDSAPI-Header information in the API-Control-Packet by handling these packets in P4 DMA pipeline entirely, without involving the DPU's ARM CPU core(s). The exemplary methods also facilitate data-path P4 tables to be programmed from the host x86 CPU(s) based software-agents via the high-performance DPDK-based packet-interface instead of a gRPC/remote-IPC mechanism to provide higher scaling/table programming rates that may be equivalent of packets-per-second rates through the DPU.

Figure 3:
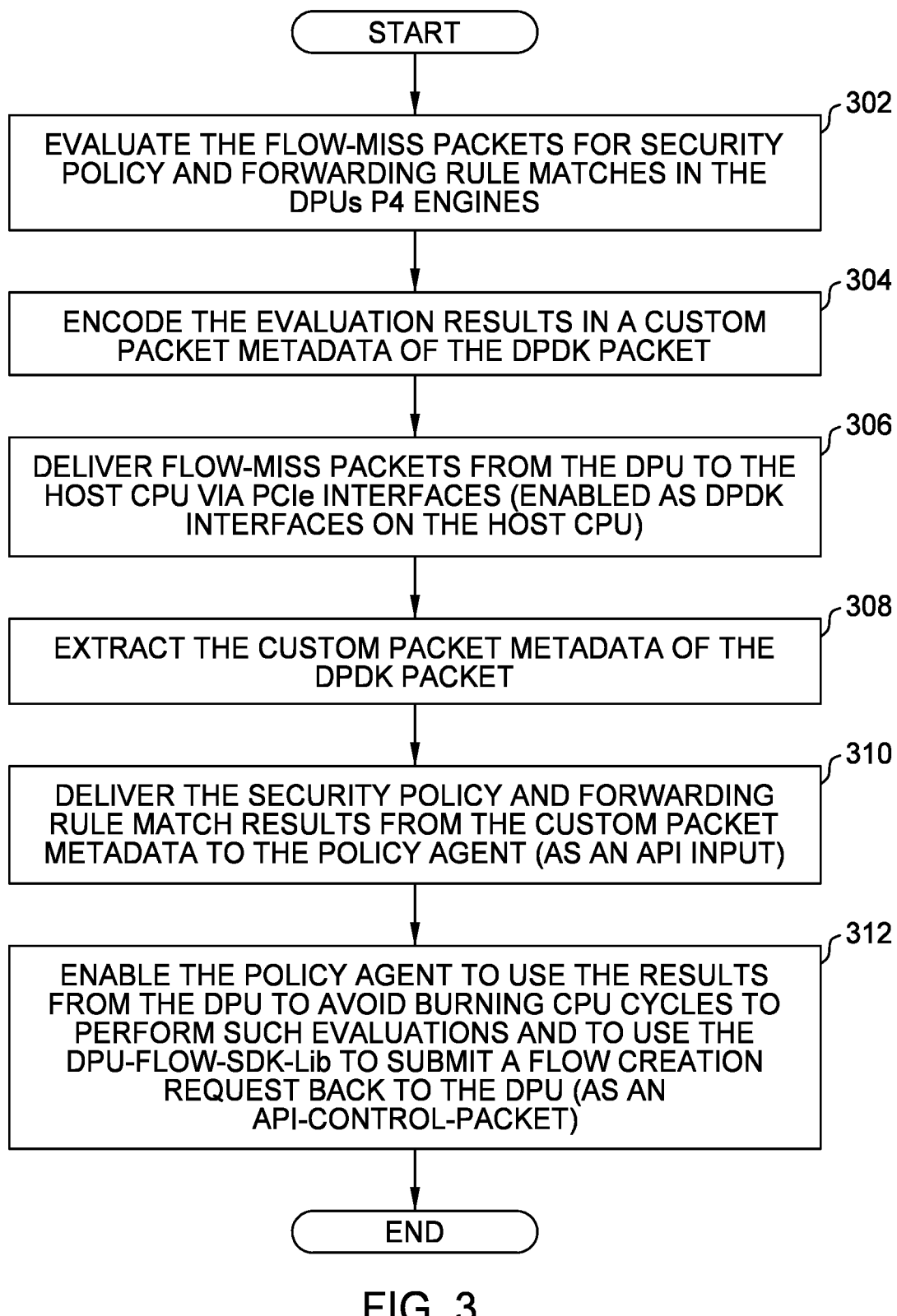
FIG. 3 illustrates a method for evaluating flow-miss packets and transmitting evaluation results to a policy agent, according to an example.

FIG. 3 illustrates a method for evaluating flow-miss packets and transmitting evaluation results to a policy agent, according to an example.

At block 302, flow-miss packets are evaluated for security policy and forwarding rule matches in the DPUs P4 engines.

At block 304, the evaluation results are encoded in a custom packet metadata of the DPDK packet.

At block 306, the flow-miss packets are delivered from the DPU to the host CPU via PCIe interfaces (enabled as DPDK interfaces on the host CPU).

At block 308, the custom packet metadata of the DPDK packet are extracted.

At block 310, the security policy and forwarding rule match results are delivered from the custom packet metadata to the policy agent (as an API input).

At block 312, the policy agent uses the results from the DPU to avoid burning CPU cycles to perform such evaluations and to use a DPU-Flow-SDK-Lib to submit a flow creation request back to the DPU (as an API-Control-Packet).

Figure 4A:
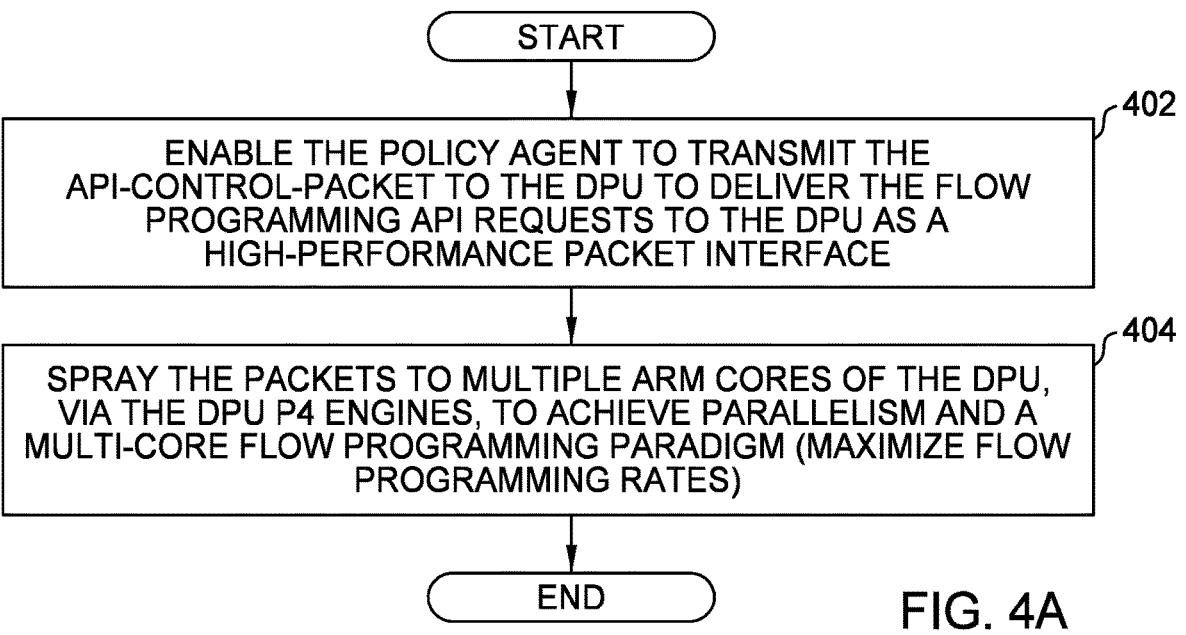
FIG. 4A illustrates a method for delivering flow programming API requests to the DPU as a high-performance packet interface, according to an example.

FIG. 4A illustrates a method for delivering flow programming API requests to the DPU as a high-performance packet interface, according to an example.

At block 402, the policy agent transmits the API-Control-Packet to the DPU to deliver the flow programming API requests to the DPU as a high-performance packet interface.

At block 404, the packets are sprayed to multiple ARM cores of the DPU, via the DPU P4 engines, to achieve parallelism and a multi-core flow programming paradigm (maximize flow programming rates).

Figure 4B:
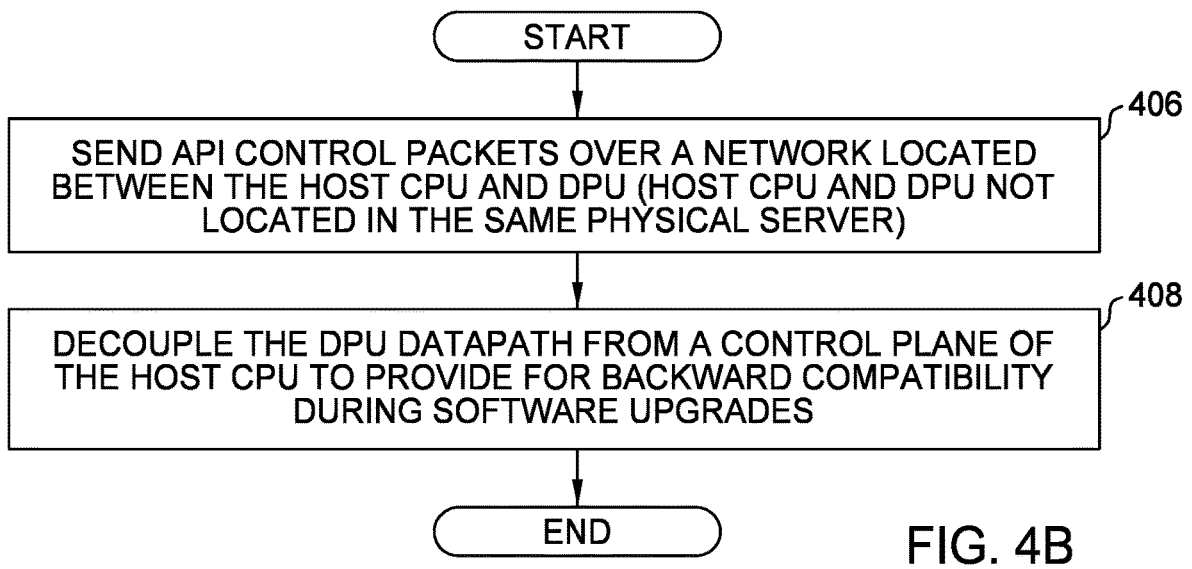
FIG. 4B illustrates a method for decoupling a DPU datapath when the host CPU and the DPU are not located within a same physical server.

FIG. 4B illustrates a method for decoupling a DPU datapath when the host CPU and the DPU are not located within a same physical server.

At block 406, the API control packets are sent over a network between the host CPU and the DPU. The host CPU and the DPU are not located in the same physical server.

At block 408, the DPU datapath is decoupled from a control plane of the host CPU to provide for backward compatibility during software upgrades.

Figure 5:
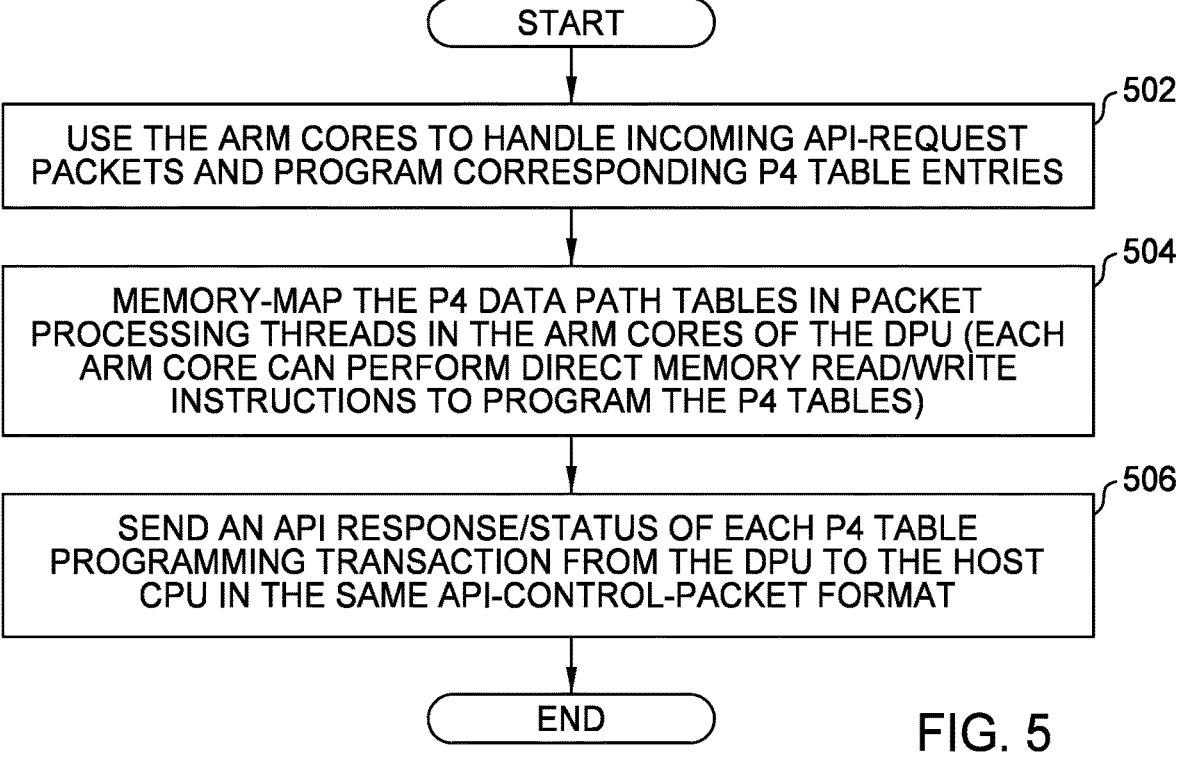
FIG. 5 illustrates a method for spraying the packets to multiple ARM CPU cores of the DPU to achieve parallelism and a multi-core flow programming paradigm, according to an example.

FIG. 5 illustrates a method for spraying the packets to multiple ARM CPU cores of the DPU to achieve parallelism and a multi-core flow programming paradigm, according to an example.

At block 502, the ARM cores are used to handle incoming API-request packets and program corresponding P4 table entries.

At block 504, the P4 data path tables are memory-mapped in packet processing threads in the ARM cores of the DPU (each ARM core may perform direct memory read/write instructions to program the P4 tables).

At block 506, an API response/status of each P4 table programming transaction is sent from the DPU to the host CPU in the same API-Control-Packet format.

In conclusion, a method is presented to achieve high CPS flow table transactions (i.e., create/update/delete) in the DPU environment where the flow programming software agent is running in the host x86 CPU(s) to which the DPU is connected over the PCIe interface. As such, sustained high CPS rates of DPU flow table management can be achieved from software agent(s) running in host x86 CPU(s). The exemplary methods introduce a high-performance packet interface to perform DPU P4 flow table programming with DPDK based API-Control-Packet header to extend the high CPS flow-table paradigm from the DPU to the host x86 CPUs. The exemplary methods extend the flow evaluation hardware-assists for packet classification/security policy/forwarding decisions and the hardware flow-ageing assists to be offloaded from host software agents, and provide a library for programmatic interface for custom API-Control-Packet formats to achieve parallelism across multi-core CPUs in both the host and the DPU. The exemplary methods introduce HW offload/assist in P4-table programming of index and hash tables from the PDSAPI-Header information in the API-Control-Packet by handling these packets in P4 DMA pipeline entirely, without involving the DPU's ARM CPU core(s). The exemplary methods also facilitate data-path P4 tables to be programmed from the host x86 CPU(s)

based software-agents via the high-performance DPDK-based packet-interface instead of a gRPC/remote-IPC mechanism to provide higher scaling/table programming rates that may be equivalent of packets-per-second rates through the DPU.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A data processing unit (DPU) comprising:
a plurality of cores; and
a datapath to communicate with a policy agent of a host via a data plane development kit (DPDK) interface running on the host, wherein the datapath is configured to:
transmit packets to the host,
wherein the DPDK interface is configured to:
evaluate the packets at the host;
select, with the policy agent executing on the host, a data processing library based on packet evaluation results; and
transmit a control packet that includes the selected data processing library from the policy agent of the host to the DPU; and
receive the transmitted control packet from the host,
wherein the plurality of cores is configured to execute a software proxy to program datapath tables based on the selected data processing library and wherein write access to the datapath tables is restricted to the plurality of cores.

2. The DPU of claim 1, wherein the transmitted packets are flow-miss packets evaluated for forwarding rule matches and security policy.

3. The DPU of claim 1, wherein the packet evaluation results are encoded in a custom packet metadata of the DPDK interface.

4. The DPU of claim 1, wherein the packet evaluation results are provided as an application programming interface (API) input to the DPDK interface.

5. The DPU of claim 1, wherein the transmitted control packet is built by the selected data processing library by encoding a flow entry key and data fields into a hardware-encoded data structure.

6. The DPU of claim 5, wherein the hardware-encoded data structure specifies programming protocol-independent packet processor (P4) table identifiers, P4 table operations, P4 table keys, and P4 table data.

7. The DPU of claim 1, wherein the selected data processing library encapsulates the transmitted control packet in a packet header.

8. The DPU of claim 1, wherein, after the transmitted control packet is transmitted to the DPU, the plurality of cores is configured to adjust flow-entry programming rates of the datapath tables based on the selected data processing library.

9. The DPU of claim 1, wherein the datapath tables support flow entry processing at a connections per second (CPS) above a predetermined threshold to support increased CPS flow table transactions.

10. A system comprising:
a host including a policy agent executing on the host and a data plane development kit (DPDK) interface; and
a data processing unit (DPU) to transmit packets to the host, wherein the DPDK interface of the host performs operations including:

evaluating the transmitted packets at the host;
generating packet evaluation results;
selecting, with the policy agent executing on the host, a data processing library based on the packet evaluation results; and
transmitting a control packet containing the selected data processing library from the policy agent of the host to the DPU,
wherein the DPU is further configured to receive the transmitted control packet and execute a software proxy on a plurality of cores to program datapath tables based on the selected data processing library and wherein write access to the datapath tables is restricted to the plurality of cores.

11. The system of claim 10, wherein the transmitted packets are flow-miss packets evaluated for forwarding rule matches and security policy.

12. The system of claim 10, wherein the packet evaluation results are encoded in a custom packet metadata of the DPDK interface.

13. The system of claim 10, wherein the packet evaluation results are provided as an application programming interface (API) input to the DPDK interface.

14. The system of claim 10, wherein the transmitted control packet is built by the selected data processing library by encoding a flow entry key and data fields into a hardware-encoded data structure.

15. The system of claim 14, wherein the hardware-encoded data structure specifies programming protocol-independent packet processor (P4) table identifiers, P4 table operations, P4 table keys, and P4 table data.

16. The system of claim 10, wherein, after the transmitted control packet is transmitted to the DPU, DPU P4 engines of the DPU spray the transmitted packets to a plurality of cores of the DPU.

17. The system of claim 10, wherein the datapath tables support flow entry processing at a connections per second (CPS) above a predetermined threshold to support increased CPS flow table transactions.

18. A non-transitory computer-readable storage medium storing instructions, which when executed on one or more processing devices, uses a data plane development kit (DPDK) interface running on a host to perform operations including:
receiving packets from a data processing unit (DPU);
evaluating the received packets at the host;
generating packet evaluation results;
selecting, with a policy agent executing on the host, a data processing library based on the generated packet evaluation results; and
transmitting, to the DPU, a control packet comprising the selected data processing library from the policy agent of the host.

19. The non-transitory computer-readable storage medium of claim 18, wherein the selected data processing library is used to build a control packet to program datapath tables and wherein the control packet is built by encoding a flow entry key and data fields into a hardware-encoded data structure.

20. The non-transitory computer-readable storage medium of claim 19, wherein the hardware-encoded data structure specifies programming protocol-independent packet processor (P4) table identifiers, P4 table operations, P4 table keys, and P4 table data.

* * * * *